United States Patent [19]

Sugano et al.

[11] 3,950,126

[45] Apr. 13, 1976

[54] METHOD FOR PROMOTING BLEACHING EMPLOYING CHLORO-S-TRIAZINES

[75] Inventors: Junichiro Sugano; Minoru Kakuda, both of Yokkaichi; Tokuzo Tsuiki, Tokyo, all of Japan

[73] Assignee: Mitsubishi Gas Chemical Co. Inc., Tokyo, Japan

[22] Filed: July 24, 1973

[21] Appl. No.: 382,166

[30] Foreign Application Priority Data

July 29, 1972 Japan ................................ 47-75537

[52] U.S. Cl. ....................... 8/111; 252/99; 252/102; 252/186

[51] Int. Cl.$^2$.. C01B 15/00; C11D 7/18; D06L 3/00

[58] Field of Search ............ 8/111; 252/95, 99, 102, 252/186; 260/248 CS

[56] References Cited

UNITED STATES PATENTS

| | | | |
|---|---|---|---|
| 3,203,550 | 8/1965 | Schaefer | 260/248 CS |
| 3,332,882 | 7/1967 | Blumbergs et al. | 252/186 |
| 3,361,746 | 1/1968 | Schmeizer et al. | 260/248 CS |

*Primary Examiner*—Leland A. Sebastian
*Assistant Examiner*—Christine M. Nucker
*Attorney, Agent, or Firm*—Sherman & Shalloway

[57] ABSTRACT

A method for promoting the bleaching action of a peroxy bleaching agent which comprises using as an activating agent for the bleaching agent at least one chloro-s-triazine derivative of the formula

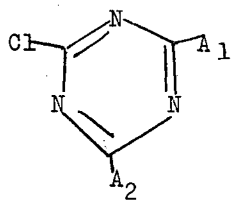

wherein $A_1$ and $A_2$ are substituents which are the same or different and each represents a chlorine atom or (1) $-OR_1$ wherein $R_1$ is an alkyl group containing not more than 12 carbon atoms or (2)

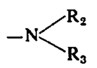

wherein $R_2$ and $R_3$ are the same or different and each represents a hydrogen atom or an alkyl group containing not more than 12 carbon atoms, with the proviso that $A_1$ and $A_2$ are not chlorine atoms at the same time.

12 Claims, No Drawings

METHOD FOR PROMOTING BLEACHING EMPLOYING CHLORO-S-TRIAZINES

This invention relates to a method for promoting the bleaching action of a peroxy bleaching agent by activating it. The material to be bleached includes woven fabrics of natural and synthetic fibers.

Peroxy bleaching agents have been used either alone or in admixture with detergents or disinfectants, but because of their low effectiveness at temperatures below 80°C., they have been unsuitable for maintaining the whiteness of clothing, especially when used in household washings that are carried out at low temperatures. In an attempt to remedy this defect, a method has been proposed in which an activating agent is added to the peroxy bleaching agent in order to render it effective at low temperatures. Examples of the activating agents that have been proposed are carboxylic acid anhydrides, o-acylated compounds, N-acylated compounds, phenol esters and nitrile derivatives. Some effects have been obtained with these activating agents, but they require heating at 50° to 60°C. for satisfactory bleaching effects because of low degree of activation, or they have poor stability which causes decomposition in only 2 or 3 days. Thus, none of the previously suggested activating agents have proved satisfactory. For this reason, it has been desired to provide activating agents which are more effective than the conventional activating agents and exhibit good bleaching effects at low temperatures when used together with bleaching compounds having active oxygen atoms.

It has now been found that chloro-s-triazine derivatives are effective as activating agents for peroxy bleaching agents and by adding these activating agents to an aqueous solution of a peroxy bleaching agent, these agents promote the bleaching action of the peroxy bleaching agent to a prominent extent at about 20° to 40°C.

According to the present invention, there is provided a method in which at least one chloro-s-triazine derivative of the formula (1)

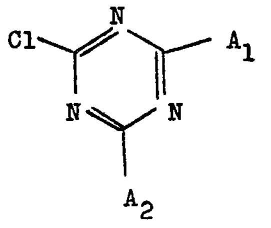

wherein $A_1$ and $A_2$ are substituents which are the same or different and each represent a chlorine atom or (1) $-OR_1$ wherein $R_1$ is an alkyl group containing not more than 12 carbon atoms or (2)

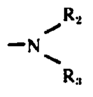

wherein $R_2$ and $R_3$ are the same or different and each represent a hydrogen atom or an alkyl group containing not more than 12 carbon atoms, with the proviso that $A_1$ and $A_2$ are not chlorine atoms at the same time, is used as an activating agent for a peroxy bleaching agent.

The chloro-s-triazine derivatives are monochloro and dichloro derivatives, and the trichloro derivatives are excluded.

The peroxy bleaching agent used in this invention is a known bleaching agent which includes, for example, hydrogen peroxide, metal peroxides, peroxy hydrates, or per-salts. Examples of the metal peroxide are sodium peroxide, calcium peroxide, potassium peroxide, zinc peroxide, and magnesium peroxide. An example of the peroxy hydrates is urea peroxyhydrate. Examples of the per-salts are perborates such as sodium perborate or potassium perborate, perphosphates such as sodium perphosphate or sodium perpyrophosphate, and percarbonates such as sodium percarbonate or sodium perbicarbonate.

In the present invention, the activating agent specified by the formula (1) is used together with the peroxy bleaching agent. The suitable amount of the activating agent to be used is one sufficient for providing 0.3 to 1.5 atoms, preferably 0.5 to 1.0 atom, of chlorine attached to the triazine ring, per atom of the effective active oxygen. The effective active oxygen of the peroxy bleaching agent means oxygen in the nascent state which becomes free during bleaching.

The bleaching operation comprises dissolving the peroxy bleaching agent and the activating agent in water together, if desired, with a detergent and/or a disinfectant, and dipping a textile fabric in the solution. The amount of the bleaching agent used at this time can be freely selected according to the degree of whiteness desired. In household use, the suitable amount of the bleaching agent is one sufficient for providing 10 to 100 ppm of active oxygen in the washing solution. The bleaching temperature is 20° to 40°C., but higher temperatures may be used. Furthermore, in the present invention, one or more kinds each of the peroxy bleaching agent and the activating agent can be used.

According to the present invention, excellent bleaching effects can be obtained at relatively low temperatures, and the activating agent used is stable and maintains its effects for prolonged periods of time. Therefore, the activating agent used in this invention is very suitable for washing in the home.

The following Examples and Comparative Examples illustrate the present invention. In these examples, the activating agent is expressed by the type of $A_1$ and $A_2$ in the above-given general formula. The procedures for preparing soiled fabrics and the measurement of the bleaching effects were as follows:

Preparation of Soiled Fabrics

Ten cotton fabrics (each 13 cm × 13 cm, weighing 2.5 g) which were desired and unbleached were dipped at 70°C. for 30 minutes in a solution of 50 g of instant coffee in 1 liter of water. The soiled fabrics were squeezed to remove excess solution, dried, rinsed with cold water, and then dried.

Method of Bleaching Test 250 ml. of a standard 0.2% cleansing solution (containing 0.2% of a chemical consisting of 25% of sodium dodecylbenzenesulfonate, 25% sodium tripolyphosphate and 50% of sodium sulfate anhydride) and one soiled fabric prepared as mentioned above were placed in a vessel of a laundry tester, and predetermined amounts of a peroxy bleaching agent and an activating agent were added. The laundry tester was operated for 15 minutes at 42 cycles per minute. Then, the soiled fabric was withdrawn from the vessel, washed with cold water, and then dried. The whiteness of the cotton fabric before and after the operation of the laundry tester was measured using a color and color difference meter (product of Toyo Rika Company), and the bleaching efficiency was calculated from the following equation.

$$\text{Bleaching efficiency (\%)} = \frac{\text{Whiteness after bleaching - Whiteness after soiling}}{\text{Whiteness before soiling - Whiteness after soiling}} \times 100$$

EXAMPLES 1 TO 6

A bleaching test was performed at a temperature of 20°C., 40°C. and 60°C. in accordance with the above method using sodium perborate tetrahydrate as a peroxy bleaching agent and various chloro-s-triazine derivatives as activating agents. The amount of the bleaching agent was such as to provide 50 ppm of active oxygen, and the amount of the activating agent was such as to provide one chlorine atom per atom of the active oxygen. The results obtained are shown in Table 1.

In order to test the degree of maintenance of activity after standing for a long time, a mixture of the standard cleansing solution, the peroxy bleaching agent and the activating agent was allowed to stand at room temperature for a predetermined period of time, and then the bleaching test was performed at 40°C. The results obtained are also shown in Table 1.

Table 1

| Examples Nos. | Activating Agent | | Bleaching efficiency just after preparation | | | Bleaching efficiency after standing for long time | |
|---|---|---|---|---|---|---|---|
| | $A_1$ | $A_2$ | 20°C. | 40°C. | 60°C. | After 2 weeks | After 4 weeks |
| 1 | $-NH_2$ | $-Cl$ | 64.2 | 69.7 | 78.6 | 63.2 | 61.1 |
| 2 | $-NHCH_3$ | $-Cl$ | 62.9 | 65.5 | 69.1 | 59.4 | 57.3 |
| 3 | $-N(C_2H_5)_2$ | $-Cl$ | 48.6 | 63.9 | 81.2 | 58.2 | 57.2 |
| 4 | $-OCH_3$ | $-Cl$ | 55.9 | 69.3 | 73.7 | 62.8 | 61.3 |
| 5 | $-OCH_3$ | $-OCH_3$ | 70.0 | 82.3 | 89.7 | 78.3 | 76.4 |
| 6 | $-NHCH_3$ | $-NHCH_3$ | 53.8 | 71.7 | 84.5 | 64.3 | 61.5 |

COMPARATIVE EXAMPLE 1

Example 1 was repeated except that the activating agent was not used. The bleaching efficiencies at 20°C., 40°C. and 60°C. were 44.1%, 55.0%, and 63.0% respectively. On the other hand, a mixture consisting of the standard cleansing solution and the peroxy bleaching agent was allowed to stand for 2 weeks and for 4 weeks, and the bleaching test was then performed at 40°C. In each case, the bleaching efficiency was 54.0%.

COMPARATIVE EXAMPLES 2 TO 4

Example 1 was repeated except that tetraacetyl ethylene diamine, N-acetyl-N-phenyl methanesulfonamide, and cyanuric acid diacetate were used instead of the activating agent used in Example 1. The amounts of the activating agents used were 0.25 mol, 1 mol, and 0.5 mol respectively per atom of the active oxygen. The results obtained are shown in Table 2.

Table 2

| Comparative Examples | Activating agent | Bleaching efficiency (%) 20°C. | 40°C. | 60°C. |
|---|---|---|---|---|
| 2 | Tetracetyl ethylene diamine | 49.0 | 64.2 | 72.4 |
| 3 | N-acetyl-N-phenyl methanesulfonamide | 48.2 | 65.3 | 70.0 |
| 4 | Cyanuric acid diacetate | 53.8 | 63.7 | 79.8 |

The maintenance of the activity of the bleaching agent was tested in the same way as in Example 1 after standing at room temperature for the prescribed time with reference to the case of using cyanuric acid diacetate as an activating agent. It was found that only after 3 days, the bleaching efficiency was 55.0% which is almost the same as in the case of adding no activating agent (Comparative Example 1). This shows that cyanuric acid diacetate readily decomposed in the air, and as a result, the effect of the activating agent was completely lost after 3 days.

EXAMPLES 7 TO 10

A bleaching test was performed in accordance with the above-described method using hydrogen peroxide as a peroxy bleaching agent and various chloro-s-triazine derivatives as activating agents. The amount of the bleaching agent was such as to provide 50 ppm of active oxygen, and the amount of the activating agent was such as to provide one chlorine atom per atom of the active oxygen. The results obtained are shown in Table 3.

Table 3

| Examples Nos. | Activating Agent $A_1$ | $A_2$ | Bleaching efficiency (%) 20°C. | 40°C. | 60°C. |
|---|---|---|---|---|---|
| 7 | $-NH_2$ | $-Cl$ | 61.3 | 68.2 | 77.5 |
| 8 | $-OCH_3$ | $-Cl$ | 52.3 | 67.4 | 72.9 |
| 9 | $-NH_2$ | $-NH_2$ | 50.4 | 70.8 | 83.1 |

Table 3-continued

| Examples Nos. | Activating Agent $A_1$ | $A_2$ | Bleaching efficiency (%) 20°C. | 40°C. | 60°C. |
|---|---|---|---|---|---|
| 10 | $-OCH_3$ | $-OCH_3$ | 67.8 | 81.2 | 88.5 |

COMPARATIVE EXAMPLE 5

Example 7 was repeated except that the activating agent was not used. The bleaching efficiencies at 20°C., 40°C. and 60°C. were 41.9%, 53.3%, and 61.0%, respectively.

EXAMPLES 11 TO 14

A bleaching test was carried out in accordance with the above-mentioned method using sodium percarbonate as a peroxy bleaching agent and various chloro-s-triazine derivatives as activating agents. The amount of the bleaching agent was such as to provide 50 ppm of active oxygen, and the amount of the activating agent was such as to provide one chlorine atom per atom of the active oxygen. The results are shown in Table 4.

Table 4

| Examples | Activating agent $A_1$ | $A_2$ | Bleaching efficiency (%) 20°C. | 40°C. | 60°C. |
|---|---|---|---|---|---|
| 11 | $-NH_2$ | $-Cl$ | 67.2 | 71.3 | 80.1 |
| 12 | $-OCH_3$ | $-Cl$ | 58.1 | 72.5 | 75.9 |
| 13 | $-OCH_3$ | $-OCH_3$ | 72.0 | 83.9 | 89.2 |
| 14 | $-NH_2$ | $-NH_2$ | 55.2 | 71.4 | 85.2 |

COMPARATIVE EXAMPLE 6

Example 11 was repeated except that the activating agent was not used. The bleaching efficiencies at 20°C., 40°C. and 60°C. were 49.2%, 59.2% and 66.3%, respectively.

EXAMPLES 15 TO 18

A bleaching test was carried out by the above-described method using sodium peroxide as a peroxy bleaching agent and various chloro-s-triazine derivatives as activating agents. The amount of the bleaching agent was such as to provide 50 ppm of active oxygen, and the amount of the activating agent was such as to provide one chlorine atom per atom of the active oxygen. The results obtained are shown in Table 5.

Table 5

| Examples | Activating agents $A_1$ | $A_2$ | Bleaching efficiency (%) 20°C. | 40°C. | 60°C. |
|---|---|---|---|---|---|
| 15 | $-NH_2$ | $-Cl$ | 62.6 | 67.2 | 77.8 |
| 16 | $-OCH_3$ | $-Cl$ | 53.3 | 64.5 | 72.6 |
| 17 | $-OCH_3$ | $-OCH_3$ | 67.2 | 81.5 | 88.3 |
| 18 | $-NH_2$ | $-NH_2$ | 50.5 | 70.3 | 82.0 |

COMPARATIVE EXAMPLE 7

Example 15 was repeated except that the activating agent was not used. The bleaching efficiencies at 20°C., 40°C. and 60°C. were 42.1%, 51.0%, and 60.1%, respectively.

EXAMPLE 19

A bleaching test was performed in accordance with the above-described method using urea peroxyhydrate as a peroxy bleaching agent and 2-chloro-4,6-dimethoxy-s-triazine as an activating agent. The amount of the bleaching agent was such as to provide 50 ppm of active oxygen, and the amount of the activating agent was such as to provide one chlorine atom per atom of the active oxygen. The bleaching efficiencies at 20°C., 40°C. and 60°C. were 68.0%, 80.0%, and 86.5%, respectively.

EXAMPLE 20

A bleaching test was performed in accordance with the above-described method using sodium perpyrophosphate as a peroxy bleaching agent, and a 3:1 (mole ratio) mixture of 2-chloro-4,6-dimethoxy-s-triazine and 2,4-dichloro-6-methoxy-s-triazine as an activating agent. The amount of the bleaching agent was such as to provide 50 ppm of active oxygen, and the amount of the activating agent was such as to provide one chlorine atom per atom of the active oxygen. The bleaching efficiencies at 20°C., 40°C., and 60°C. were 70.2%, 81.5%, and 88.0%, respectively.

What we claim is:

1. In a method for promoting the bleaching action of a peroxy bleaching agent by forming a mixture of peroxy bleaching agent with an activating agent, the improvement which comprises using as said activating agent for the bleaching agent at least one chloro-s-triazine derivative of the formula

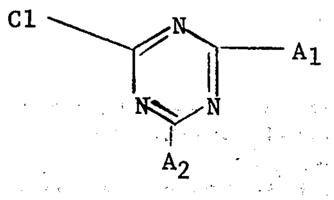

wherein $A_1$ and $A_2$ are substituents which are the same or different and each represents chlorine atom or (1) $-OR_1$ wherein $R_1$ is an alkyl group containing not more than 12 carbon atoms or (2)

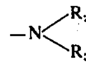

wherein $R_2$ and $R_3$ are the same or different and each represents hydrogen atom or an alkyl group containing not more than 12 carbon atoms, which the proviso that $A_1$ and $A_2$ are not chlorine atoms at the same time said activating agent being present in an amount sufficient to activate said bleaching agent.

2. The method of claim 1 wherein said peroxy bleaching agent is at least one member selected from the group consisting of peroxy hydrates, per-salts, metal peroxides and hydrogen peroxide.

3. The method of claim 1 wherein the amount of the activating agent is sufficient to provide 0.3 to 1.5 atoms of chlorine attached to the triazine ring, per atom of the effective oxygen of the peroxy bleaching agent.

4. The method of claim 1 wherein said activating agent is at least one member selected from the group consisting of

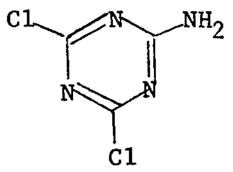
,
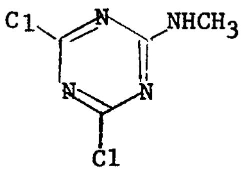
,
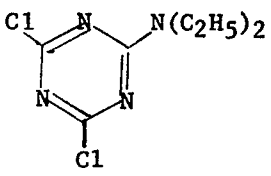
,
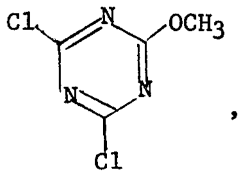
,
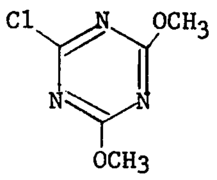
,
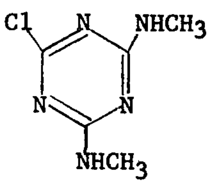
, and
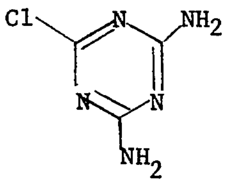
.

5. In a method for bleaching fabric of natural or synthetic fibers by contacting the fabric with a peroxy bleaching agent and an activating agent which promotes the activity of the bleaching agent the improvement comprising immersing said fabric at a temperature of at least 20°C in an aqueous mixture of at least one peroxy bleaching agent in an amount sufficient to provide 10 to 100 ppm of active oxygen in said mixture and as said activating agent at least one chloro-s-triazine derivative of the formula

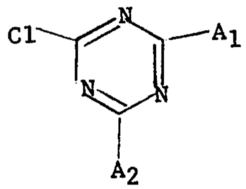

wherein $A_1$ and $A_2$ are substituents which are the same or different and each represents a chlorine atom or (1) —$OR_1$ wherein $R_1$ is an alkyl group containing not more than 12 carbon atoms or (2)

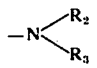

wherein $R_2$ and $R_3$ are the same or different and each represents a hydrogen atom or an alkyl group containing not more than 12 carbon atoms, with the proviso that $A_1$ and $A_2$ are not chlorine atoms at the same time, in an amount sufficient to provide 0.3 to 1.5 atoms of chlorine attached to the triazine ring, per atom of the effective oxygen of the peroxy bleaching agent.

6. The method of claim 5 wherein said peroxy bleaching agent is at least one member selected from the group consisting of peroxy hydrates, per-salts, metal peroxides and hydrogen peroxide.

7. The method of claim 5 wherein said activating agent is at least one member selected from the group consisting of

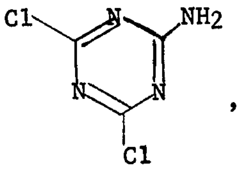
,
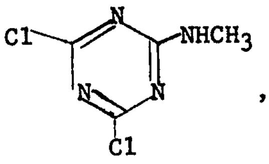
,
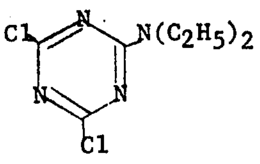
,

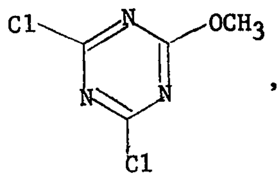,
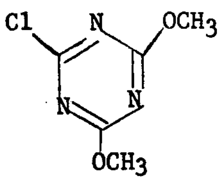,
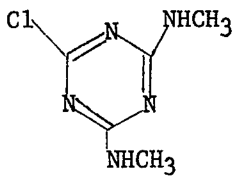, and
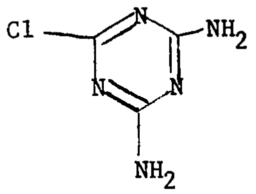

8. An activated peroxy bleaching composition comprising an aqueous mixture of at least one peroxy bleaching compound and as an activating agent, which promotes the activity of and stabilizes the peroxy bleaching compound from decomposition at temperatures as low as 20°C, at least one chloro-s-triazine derivative of the formula

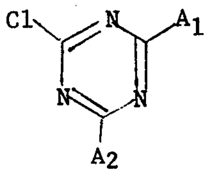

wherein $A_1$ and $A_2$ are substituents which are the same or different and each represents a chlorine atom or (1) —$OR_1$ wherein $R_1$ is an alkyl group containing not more than 12 carbon atoms or (2)

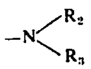

wherein $R_2$ and $R_3$ are the same or different and each represents a hydrogen atom or an alkyl group containing not more than 12 carbon atoms, with the proviso that $A_1$ and $A_2$ are not chlorine atoms at the same time said activating agent being present in an amount sufficient to activate said peroxy bleaching compound.

9. The composition of claim 8 wherein said peroxy bleaching agent is at least one member selected from the group consisting of peroxy hydrates, per-salts, metal peroxides and hydrogen peroxide.

10. The composition of claim 8 wherein the amount of the activating agent is sufficient to provide 0.3 to 1.5 atoms of chlorine attached to the triazine ring, per atom of the effective oxygen of the peroxy bleaching agent.

11. The composition of claim 8 wherein said activating agent is at least one member selected from the group consisting of

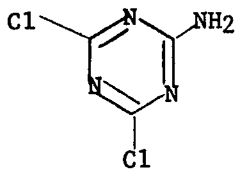,
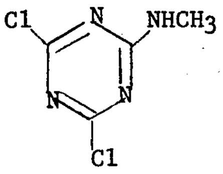,
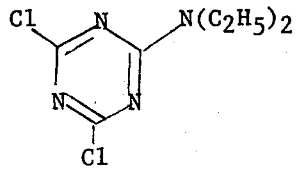,
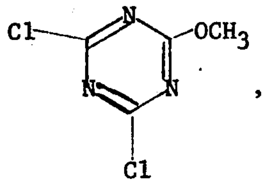,
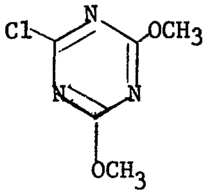,
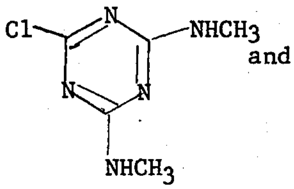
and
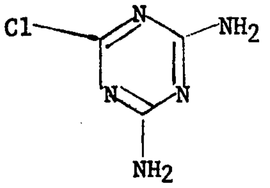.

12. The composition of claim 8 wherein said peroxy bleaching agent is present in said aqueous mixture in an amount sufficient to provide 10 to 100 ppm of active oxygen in said mixture.

* * * * *